(12) United States Patent
Aggarwal et al.

(10) Patent No.: US 10,057,710 B2
(45) Date of Patent: Aug. 21, 2018

(54) TECHNIQUES FOR AUGMENTING GPS-BASED NAVIGATION VIA LIGHT-BASED COMMUNICATION

(71) Applicant: OSRAM SYLVANIA Inc., Wilmington, MA (US)

(72) Inventors: Anant Aggarwal, Waltham, MA (US); Bernhard Siessegger, Unterschleissheim (DE); Christian Breuer, Dortmund (DE); Barry Stout, Beverly, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/127,786

(22) PCT Filed: Mar. 24, 2015

(86) PCT No.: PCT/US2015/022315
§ 371 (c)(1),
(2) Date: Sep. 20, 2016

(87) PCT Pub. No.: WO2015/148556
PCT Pub. Date: Oct. 1, 2015

(65) Prior Publication Data
US 2017/0099571 A1 Apr. 6, 2017

Related U.S. Application Data
(60) Provisional application No. 61/970,314, filed on Mar. 25, 2014.

(51) Int. Cl.
*H04W 24/00* (2009.01)
*H04W 4/02* (2018.01)
(Continued)

(52) U.S. Cl.
CPC ............ *H04W 4/02* (2013.01); *G01C 21/206* (2013.01); *G01S 19/48* (2013.01)

(58) Field of Classification Search
CPC ........ H04W 4/02; H04W 64/00; H04W 48/04
See application file for complete search history.

(56) References Cited

U.S. PATENT DOCUMENTS

2011/0153201 A1 6/2011 Park et al.
2012/0072051 A1* 3/2012 Koon .................. G05D 1/0278
701/2

(Continued)

FOREIGN PATENT DOCUMENTS

GB 2 475 713 A 6/2011

OTHER PUBLICATIONS

C O Donnabhain, International Search Report and Written Opinion of the International Searching Authority for PCT/US2015/022315, dated Sep. 30, 2015, pp. 1-15, European Patent Office, Rijswijk, The Netherlands.

*Primary Examiner* — Steve D Agosta
(74) *Attorney, Agent, or Firm* — Yutian Ling (57) ABSTRACT

Techniques are disclosed for augmenting global positioning system (GPS)-based navigation via light-based communication (LCom). In accordance with some embodiments, a light-sensing device, such as a camera or an ambient light sensor configured as described herein, may be used to detect an LCom signal transmitted by a local LCom-enabled solid-state luminaire. The LCom signal may include data about the location of the transmitting luminaire, and in some cases that location data may be used, for example, in computing the amount of time that it would take to navigate indoors to the luminaire's location. In some instances, GPS data also may be considered to calculate the total trip duration for an entire trip, including time spent indoors and outdoors. In some (Continued)

other cases, the location data and, if available, GPS data may be used, for example, in computing an automotive navigation route.

15 Claims, 4 Drawing Sheets

(51) Int. Cl.
*G01C 21/20* (2006.01)
*G01S 19/48* (2010.01)

(56) References Cited

U.S. PATENT DOCUMENTS

| 2012/0173130 A1 | 7/2012 | Tsuda et al. |
| 2013/0027576 A1 | 1/2013 | Ryan et al. |

* cited by examiner

TECHNIQUES FOR AUGMENTING GPS-BASED NAVIGATION VIA LIGHT-BASED COMMUNICATION

CROSS-REFERENCE TO RELATED APPLICATIONS

This patent application is a National Stage application of, and claims the benefit of, International Application No. PCT/US2015/022315, filed Mar. 24, 2015, which claims the benefit of U.S. Provisional Patent Application No. 61/970,314, titled "Light Communication and Global Positioning," filed on Mar. 25, 2014, which is herein incorporated by reference in its entirety.

FIELD OF THE DISCLOSURE

The present disclosure relates to solid-state lighting (SSL) and more particularly to light-based communication via SSL.

BACKGROUND

Global positioning system (GPS) devices are commonly used to facilitate navigation on Earth. These GPS devices are designed to communicate with orbiting satellites that transmit location and time information. Closer to the Earth's surface, such satellite-based navigation can be supplemented using local area wireless technologies, such as Wi-Fi, which utilize radio frequency (RF) signals to communicate with nearby compatible devices. These types of wireless technologies typically employ wireless access points (Wi-Fi hotspots) to establish network access, and in cases of secured wireless networks, a password or other security credentials normally must be provided in order to gain network access.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

Techniques are disclosed for augmenting global positioning system (GPS)-based navigation via light-based communication (LCom). In accordance with some embodiments, a light-sensing device, such as a camera or an ambient light sensor configured as described herein, may be used to detect an LCom signal transmitted by a local LCom-enabled solid-state luminaire. The LCom signal may include data about the location of the transmitting luminaire, and in some cases that location data may be used, for example, in computing the amount of time that it would take to navigate indoors to the luminaire's location. In some instances, GPS data also may be considered to calculate the total trip duration for an entire trip, including time spent indoors and outdoors. In some other cases, the location data and, if available, GPS data may be used, for example, in computing an automotive navigation route, including covered areas where a GPS signal is unavailable or otherwise insufficient, such as in a relatively long tunnel or a covered parking structure. Numerous configurations and variations will be apparent in light of this disclosure.

General Overview

Existing global positioning system (GPS)-based navigation technologies only provide for navigation and trip time calculations in outdoor contexts. When the user reaches the destination and moves indoors, location tracking and trip time calculation stop. In addition, existing GPS-based automotive navigation systems have difficulties in obtaining and maintaining a GPS signal, for example, in parking garages, tunnels, and congested areas, among others. In these environments, the GPS either reports the wrong position or that the GPS signal cannot be found. Also, with some existing GPS-based automotive navigation systems, when the GPS signal is lost, vehicle location is extrapolated based on the last known speed or readings from wheel and steering wheel sensors. However, these approaches are unreliable in that they provide only indirect conclusions of current location, often not accounting for any changes in the speed of the vehicle or taking turns or other deviation from the last known course.

Thus, and in accordance with some embodiments of the present disclosure, techniques are disclosed for augmenting global positioning system (GPS)-based navigation via light-based communication (LCom). The techniques may be particularly useful, for example, in indoor and other environments where GPS signals are typically unavailable or of poor quality, in accordance with some embodiments. As used herein, light-based communication (LCom) generally refers to communication between a solid-state luminaire and a receiver device, such as another solid-state luminaire or a smartphone or other mobile computing device, using a pulsing light signal that emanates from the luminaire and is encoded with data. In general, the light utilized in LCom may be of any spectral band, visible or otherwise, and may be of any intensity, as desired for a given target application or end-use. In accordance with some embodiments, a given LCom-enabled luminaire may be configured to transmit a pulsing light signal encoded with data (an LCom signal), and a given receiver device, such as a smartphone or other mobile computing device, may be configured to detect the pulsing light signal encoded with data via one or more light-sensing devices, such as a camera or an ambient light sensor (or both).

In accordance with some embodiments, a light-sensing device, such as a camera or an ambient light sensor configured as described herein, may be used to detect LCom signals transmitted by one or more local LCom-enabled solid-state luminaires. To that end, the LCom-detection capabilities of the light-sensing device can be customized as desired for a given target application or end-use. A given light-sensing device may be a stand-alone component or a portion of a computing device (mobile or otherwise), and in some cases may be integrated, in part or in whole, with a GPS unit, for example. In some instances, the light-sensing device may be hosted by an automobile or other vehicle. Numerous suitable configurations will be apparent in light of this disclosure.

In some instances, an LCom signal detected by a light-sensing device configured as described herein may include data about the location of the LCom-enabled solid-state luminaire transmitting that signal. The location data acquired by the disclosed light-sensing device may be analyzed by a processor, server, or any other computing element operatively coupled with the light-sensing device. In accordance with some embodiments, location data acquired by the disclosed light-sensing device may be used, for example, in computing the amount of time that it would take to navigate indoors to the location of the transmitting solid-state luminaire. Thus, the trip duration and estimated time of arrival (ETA) for an itinerary of places to visit, items to acquire, tasks to accomplish, or other targets or goals of interest may be calculated. In some instances, data received from another source, such as, for example, a GPS, a Wi-Fi positioning system (WPS), an accelerometer, or a combination thereof, optionally may be used in such calculations. Thus, the trip duration and ETA calculations for an entire trip, including the time spent indoors and outdoors, may be provided.

In accordance with some other embodiments, location data acquired by the disclosed light-sensing device may be used, for example, in computing an automotive navigation route. In cases where a GPS signal is unavailable or otherwise of insufficient quality, automotive navigation may be provided using location data transmitted by a given local LCom-enabled solid-state luminaire. In other cases, automotive navigation routing capabilities may be supplemented by GPS, WPS, or accelerometer data, if available.

As will be appreciated in light of this disclosure, techniques disclosed herein can be utilized in any of a wide range of LCom applications and contexts. For example, techniques disclosed herein can be utilized in transmitting location information between an LCom-enabled luminaire and a receiver device. In some instances, this information may be utilized to provide for navigation to an indoor target as well as estimation and tracking of the trip time for such navigation. In some other instances, this information may be utilized to provide for automotive navigation in contexts where GPS signals are unavailable or of poor or otherwise inadequate quality. In some cases, techniques disclosed herein can be utilized as the basis for a positioning and navigation system that may realize improvements in positioning precision and accuracy, for example, over existing GPS-based and WPS-based systems. As such, it follows that techniques disclosed herein can be utilized, in accordance with some embodiments, for navigation and tracking-related endeavors not possible with existing GPS-based and Wi-Fi-based approaches. More particularly, while the limited accuracy of existing GPS-based and Wi-Fi-based approaches is not sufficient for estimating indoor navigation time or providing automotive navigation in certain contexts, techniques disclosed herein can be utilized, in accordance with some embodiments, to allow a user to optimize or otherwise make deterministic plans regarding navigation and timing within a closed environment, for example, with real-time updates. In some cases, techniques disclosed herein may be utilized to provide indoor and outdoor navigation with such features without need for internet service access.

As will be appreciated in light of this disclosure, techniques disclosed herein can be utilized, for example, in residential buildings, commercial buildings, parking structures, roadways, tunnels, or any other structure or infrastructure that may host an LCom-enabled luminaire configured as described herein. As will be further appreciated, techniques disclosed herein may be utilized in any of a wide range of indoor environments and contexts, such as, for example, airports, train stations, hospitals, office complexes, and shopping malls, among others. Numerous configurations and variations will be apparent in light of this disclosure.

System Architecture and Operation

Figure 1:
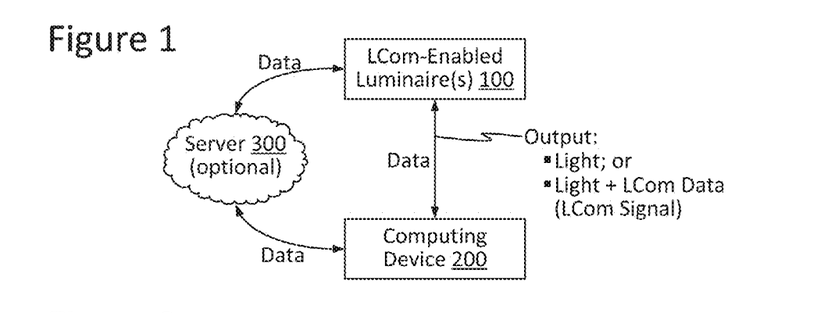
FIG. 1 illustrates an example of light-based communication (LCom) between an LCom-enabled luminaire and a computing device, in accordance with an embodiment of the present disclosure.
Figure 2:
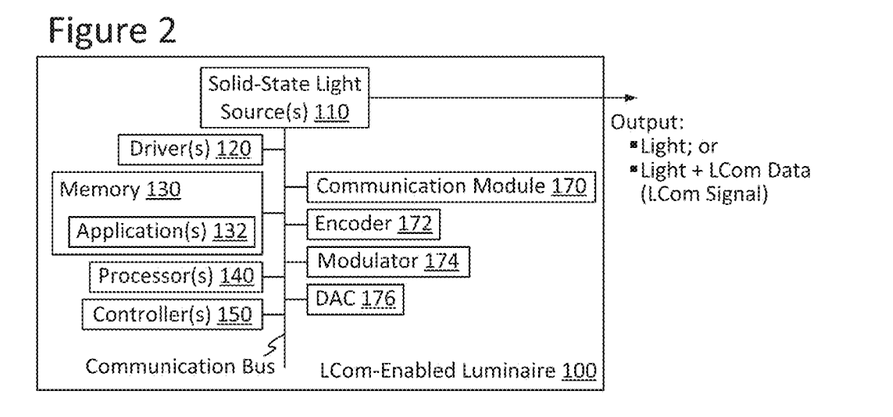
FIG. 2 is a block diagram illustrating an LCom-enabled luminaire configured in accordance with an embodiment of the present disclosure.

FIG. 1 illustrates an example of light-based communication (LCom) between an LCom-enabled luminaire 100 and a computing device 200 in accordance with an embodiment of the present disclosure. FIG. 2 is a block diagram illustrating an LCom-enabled luminaire 100 configured in accordance with an embodiment of the present disclosure. For a given LCom-enabled luminaire 100, the quantity, density, and arrangement of solid-state light sources 110 may be customized as desired for a given target application or end-use. A given solid-state light source 110 may be any semiconductor light source device, such as, for example, a light-emitting diode (LED), an organic light-emitting diode (OLED), or a polymer light-emitting diode (PLED), among others. The solid-state emitter(s) of a given solid-state light source 110 may be packaged or non-packaged, as desired, and in some cases may be populated on a printed circuit board (PCB) or other suitable intermediate or substrate. Power and control connections for a given solid-state emitter may be routed from a given PCB to a driver 120 (discussed below) or other devices or componentry of the host LCom-enabled luminaire 100.

The solid-state emitter(s) of a given solid-state light source 110 may be configured to emit light from any portion of the electromagnetic spectrum, such as, for example, the visible spectral band, the infrared (IR) spectral band, and the ultraviolet (UV) spectral band, among others. The emissions characteristics of a given solid-state light source 110 can be customized, as desired for a given target application or end-use. For instance, in some cases, a given solid-state light source 110 may be a white light-emitting semiconductor light source or otherwise configured for emissions of a single correlated color temperature (CCT). In some other cases, a given solid-state light source 110 may be a bi-color, tri-color, or other multi-color light-emitting semiconductor light source or otherwise configured for color-tunable emissions. Some example color combinations include red-green-blue (RGB), red-green-blue-yellow (RGBY), red-green-blue-white (RGBW), and dual-white, among others. In some still other cases, a given solid-state light source 110 may be a high-brightness semiconductor light source. Numerous suitable configurations for a given solid-state light source 110 will be apparent in light of this disclosure.

In accordance with some embodiments, LCom-enabled luminaire 100 may include or otherwise have access to one or more drivers 120. A given driver 120 may be a single-channel or multi-channel electronic driver configured as typically done. A given driver 120 may be configured to utilize any suitable driving technique in driving the solid-state emitter(s) of a given solid-state light source 110 of the host LCom-enabled luminaire 100. For example, a given driver 120 may be configured to utilize pulse-width modulation (PWM) dimming, current dimming, constant current reduction (CCR) dimming, triode for alternating current (TRIAC) dimming, pulse-frequency modulation (PFM) dimming, pulse-code modulation (PCM) dimming, or line voltage (mains) dimming (e.g., dimmer is connected before input of driver 120 to adjust AC voltage to driver 120), among others. Thus, in accordance with some embodiments, a given driver 120 may be utilized in controlling the emissions characteristics of an associated LCom-enabled luminaire 100, such as, for example, the on/off state, dimming level, color of emissions, correlated color temperature (CCT), and color saturation of a given solid-state emitter (or grouping of emitters), among others. Other suitable driving techniques and configurations for the one or more drivers 120 will depend on a given application and will be apparent in light of this disclosure.

In accordance with some embodiments, LCom-enabled luminaire 100 may include or otherwise have access to memory 130. Memory 130 can be random-access memory (RAM), read-only memory (ROM), a combination thereof, or any other suitable memory type. Memory 130 can be implemented with volatile memory, non-volatile memory, or a combination thereof. Memory 130 can be of any size, as desired for a given target application or end-use. In some cases, memory 130 may be configured to be utilized for processor workspace for processor(s) 140 (discussed below). In some cases, memory 130 may be configured for use in storing applications, media, programs, content, or a combination thereof, on a temporary or permanent basis. In some instances, memory 130 may be configured to serve as a cache for data, for example, pertaining to the location of the host LCom-enabled luminaire 100, alert information, advertisements, or any other data of interest. In some instances, memory 130 may be configured to store data received from optional server 300, destined for optional server 300, or both.

In accordance with some embodiments, memory 130 may have stored therein one or more modules. In accordance with some embodiments, memory 130 may have stored therein or otherwise have access to one or more applications 132. In some instances, a given LCom-enabled luminaire 100 may be configured to receive input, for example, via one or more applications 132 stored in memory 130 (e.g., such as a lighting pattern, LCom data, etc.). A given module of memory 130 can be implemented in any suitable standard, custom, or proprietary programming language, such as, for example, C, C++, objective C, or JavaScript, among others. A given module of memory 130 can be accessed and executed by a given processor 140 of LCom-enabled luminaire 100. In accordance with some embodiments, the module(s) of memory 130 can be encoded, for example, on a computer-readable medium that, when executed by a processor 140, carries out the functionality of a given LCom-enabled luminaire 100, in part or in whole. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and a number of embedded routines for carrying out device functionality. In a more general sense, the functional module(s) of memory 130 (e.g., one or more applications 132) can be implemented in hardware, software, firmware, or a combination thereof, as desired for a given target application or end-use. Other suitable modules, applications, and data which may be stored in memory 130 or may be otherwise accessible to a given LCom-enabled luminaire 100 (e.g., via a server 300 or elsewhere) will depend on a given application and will be apparent in light of this disclosure.

In accordance with some embodiments, LCom-enabled luminaire 100 may include or otherwise have access to one or more processors 140. In a general sense, a given processor 140 may be configured to perform a given operation associated with a given host LCom-enabled luminaire 100. To such ends, a given processor 140 may be configured to access and execute a given module within memory 130 or otherwise accessible to LCom-enabled luminaire 100 (e.g., via a server 300 or elsewhere). In accordance with some embodiments, a given processor 140 may be configured, for example, to analyze data received from a computing device 200 or other source and to output data that may be utilized in providing trip time estimation, automotive navigation, or any other suitable LCom-based functionality, as desired. Other suitable configurations for processor(s) 140 will depend on a given application and will be apparent in light of this disclosure.

In accordance with some embodiments, a given LCom-enabled luminaire 100 may include or otherwise have access to one or more controllers 150. A given controller 150 may be operatively coupled with a given solid-state light source 110 via a communication bus or may be hosted directly by a given solid-state light source 110. If an LCom-enabled luminaire 100 includes a plurality of solid-state light sources 110 hosting their own separate controllers 150, then each such controller 150 may be considered, in a sense, a mini-controller, providing LCom-enabled luminaire 100 with an overall distributed controller 150.

In accordance with some embodiments, a given controller 150 may host one or more lighting control modules and can be programmed or otherwise configured to output one or more control signals to adjust the operation of the solid-state emitter(s) of a given solid-state light source 110. The digital control signal output by a given controller 150 to a given solid-state light source 110 may be based, in part or in whole, on input received from a given local or remote source, such as on-board memory 130, a server 300, or a control interface, among others. In some cases, the control signal output by a given controller 150 may be used to control whether the emissions of a given solid-state emitter are turned on or off. In some instances, the control signal output by a given controller 150 may be used to brighten or dim the light emitted by a given solid-state emitter. In some cases, the control signal output by a given controller 150 may be used to mix, tune, or otherwise control the color of the light emitted by a given solid-state emitter. Thus, if a given solid-state light source 110 includes two or more solid-state emitters configured to emit light having different wavelengths, such a control signal may be used to adjust the relative brightness of the different solid-state emitters in order to change the mixed color output by that solid-state light source 110. In some instances, the control signal output by a given controller 150 may be used to facilitate encoding of LCom data via an encoder 172 (discussed below), modulation of an LCom signal via a modulator 174 (discussed below), or both. Other suitable configurations and output for a given controller 150 will depend on a given application and will be apparent in light of this disclosure.

In accordance with some embodiments, a given LCom-enabled luminaire 100 may include or otherwise have access to a communication module 170. Communication module 170 may be configured to facilitate communication between its associated LCom-enabled luminaire 100 and a computing device 200, another LCom-enabled luminaire 100, or a combination thereof. To such ends, communication module 170 may be configured to use any suitable communications means, such as, for example, radio frequency (RF) transmissions or infrared (IR) light modulation, among others. In some cases, communication module 170 may be configured for wired communication, for example, via Universal Serial Bus (USB), Ethernet, or FireWire, among others. In some cases, communication module 170 may be configured for wireless communication, for example, via Wi-Fi or Bluetooth, among others. In some instances, communication module 170 may be configured for a combination of wired and wireless communications. Communication module 170 may be configured to communicate utilizing any standard, custom, or proprietary communication protocol, such as, for example, a digital multiplexer (DMX) interface protocol, a Wi-Fi protocol, a Bluetooth protocol, a digital addressable lighting interface (DALI) protocol, a ZigBee protocol, or a combination thereof, among others. Other suitable configurations and wired and wireless communication means for communication module 170 will depend on a given application and will be apparent in light of this disclosure.

In accordance with some embodiments, LCom-enabled luminaire 100 may include an encoder 172, a modulator 174, and a digital-to-analog converter (DAC) 176. Encoder 172 may be configured to encode LCom data in preparation for transmission thereof by a host LCom-enabled luminaire 100. To that end, encoder 172 may be any suitable digital encoder configured as typically done. Modulator 174 may be configured to modulate an LCom signal in preparation for transmission thereof by the host LCom-enabled luminaire 100. Modulator 174 may be a single-channel or multi-channel electronic driver (e.g., such as driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), color saturation of a given solid-state emitter (or grouping of emitters), or a combination of any one or more thereof. To such end, modulator 174 may utilize any of the example driving techniques discussed above, for example, with respect to driver 120. DAC 176 may be configured to convert a digital control signal into an analog control signal to be applied to a given solid-state light source 110 of the host LCom-enabled luminaire 100 to output an LCom signal therefrom. To such end, DAC 176 may be any suitable digital-to-analog converter any may be configured as typically done. Other suitable configurations for encoder 172, modulator 174, and DAC 176 will depend on a given application and will be apparent in light of this disclosure.

In accordance with some embodiments, LCom-enabled luminaire 100 may be configured to output light, light encoded with LCom data (e.g., an LCom signal), or both. The LCom transmission characteristics of a given LCom-enabled luminaire 100 may be customized, as desired for a given target application or end-use. For example, transmission of a given LCom signal may be performed at a given transmission rate over a given time interval, and in some cases, a given LCom-enabled luminaire 100 may be configured to repeatedly transmit an LCom signal. The LCom signal output of a given LCom-enabled luminaire 100 may be used to provide light-based communication, for example, between that LCom-enabled luminaire 100 and a local computing device 200, another LCom-enabled luminaire 100, or both. Such LCom may be provided in one direction or in multiple directions (e.g., bi-directionally or otherwise multi-directionally), as desired. Control of the output of a given solid-state light source 110 of LCom-enabled luminaire 100 may be provided, in part or in whole, by driver 120, controller 150, or a combination thereof. In accordance with some embodiments, the one or more solid-state light sources 110 of LCom-enabled luminaire 100 can be electronically controlled to output light, light encoded with LCom data (e.g., an LCom signal), or both. A given LCom-enabled luminaire 100 may be controlled so as to output any number of output beams, which may include light, light encoded with LCom data (e.g., an LCom signal), or both.

Figure 3:
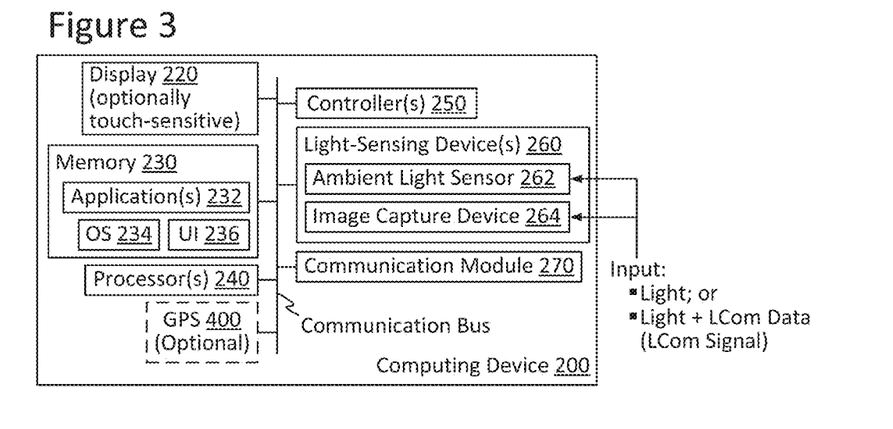
FIG. 3 is a block diagram illustrating a computing device configured in accordance with an embodiment of the present disclosure.

FIG. 3 is a block diagram illustrating a computing device 200 configured in accordance with an embodiment of the present disclosure. As discussed herein, computing device 200 may be configured to detect the light pulses of an LCom signal emitted by a transmitting LCom-enabled luminaire 100 and decode LCom data from a detected LCom signal. To such ends, computing device 200 can be any of a wide range of computing platforms, mobile or otherwise. For example, computing device 200 can be, in part or in whole, a laptop computer, notebook computer, sub-notebook computer, tablet computer, phablet computer, mobile phone, smartphone, personal digital assistant (PDA), portable media player (PMP), cellular handset, handheld gaming device, gaming platform, desktop computer, television set, wearable or otherwise body-borne computing device, such as a smartwatch, smart glasses, or smart headgear, or a combination of any one or more of the aforementioned. Other suitable configurations for computing device 200 will depend on a given application and will be apparent in light of this disclosure.

In accordance with some embodiments, computing device 200 may include memory 230. Memory 230 may be provided with any of the example configurations discussed above, for example, with respect to memory 130. In some cases, memory 230 may be configured to be utilized for processor workspace for processor(s) 240 (discussed below). In some cases, memory 230 may be configured for use in storing applications, media, programs, content, or a combination thereof, on a temporary or permanent basis. In some instances, memory 230 may be configured to serve as a cache for data, for example, pertaining to the location of the host computing device 200, alert information, advertisements, or any other data of interest. In some instances, memory 230 may be configured to store data received from optional server 300, destined for optional server 300, or both.

In accordance with some embodiments, memory 230 may have stored therein one or more modules. In accordance with some embodiments, memory 230 may have stored therein or otherwise have access to one or more applications 232. In some instances, computing device 200 may be configured to receive input, for example, via one or more applications 232 stored in memory 230. For instance, in accordance with some embodiments, memory 230 may have one or more applications 232 stored therein or otherwise accessible thereto. In an example case, memory 230 may have an indoor navigation application stored therein. A given module of memory 230 can be implemented in any suitable standard, custom, or proprietary programming language, such as, for example, C, C++, objective C, or JavaScript, among others. A given module of memory 230 can be accessed and executed by a given processor 240 of computing device 200. In accordance with some embodiments, the module(s) of memory 230 can be encoded, for example, on a computer-readable medium that, when executed by a processor 240, carries out the functionality of computing device 200, in part or in whole. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and a number of embedded routines for carrying out device functionality. In a more general sense, the functional module(s) of memory 230 (e.g., one or more applications 232) can be implemented in hardware, software, firmware, or a combination thereof, as desired for a given target application or end-use.

In accordance with some embodiments, memory 230 may have an operating system (OS) 234 stored therein or otherwise accessible thereto. OS 234 can be implemented with any suitable OS, mobile or otherwise, such as Android OS from Google, Inc., iOS from Apple, Inc., BlackBerry OS from BlackBerry Ltd., Windows Phone OS from Microsoft Corp., Palm OS/Garnet OS from Palm, Inc., or an open source OS such as Symbian OS, among others. OS 234 may be configured to aid in processing LCom data during its flow through computing device 200.

In accordance with some embodiments, memory 230 may have a user interface (UI) 236 stored therein or otherwise accessible thereto. In some cases, UI 236 of computing device 200 may be implemented in memory 230. In some other cases, UI 236 of computing device 200 may be implemented in a combination of locations, such as in memory 230 and at display 220 (discussed below), thereby providing UI 236 with a given degree of functional distributedness. UI 236 may be configured to present a graphical UI (GUI) at display 220 that aids in carrying out any of the various LCom-related techniques discussed herein. Other suitable modules (e.g., applications 232, OS 234, UI 236) and data that may be stored in memory 230 or otherwise accessible to computing device 200 (e.g., via server 300 or elsewhere) will depend on a given application and will be apparent in light of this disclosure.

In accordance with some embodiments, computing device 200 may include one or more processors 240, which may be configured as typically done. In accordance with some embodiments, a given processor 240 may be configured to perform operations associated with computing device 200. For instance, a given processor 240 may be configured to access and execute a given module within memory 230 or otherwise accessible to computing device 200 (e.g., via server 300 or elsewhere). In some cases, a given processor 240 may be configured to analyze LCom data acquired by a given light-sensing device 260 (discussed below). Other suitable configurations for processor(s) 240 will depend on a given application and will be apparent in light of this disclosure.

In accordance with some embodiments, computing device 200 may include a display 220. Display 220 can be any electronic visual display or other display device configured to generate an image, video, text, or other displayable content there at. In some instances, display 220 may be integrated, in part or in whole, with computing device 200. In some other instances, display 220 may be a stand-alone component configured to be communicatively coupled with computing device 200 using any suitable communication means, wired or wireless (or both). Display 220 optionally may be a touchscreen display or other touch-sensitive display configured to detect or otherwise sense direct, proximate, or other contact from a user's finger, stylus, or other suitable implement at a given location of that display 220. Optionally touch-sensitive display 220 may be configured to translate such contact into an electronic signal that can be processed by computing device 200 (e.g., by the one or more processors 240 thereof) and manipulated or otherwise used to trigger a given GUI action. When included, optional touch-sensitive display 220 may facilitate user interaction with computing device 200 via the GUI presented by such display 220. Other suitable configurations for display 220 will depend on a given application and will be apparent in light of this disclosure.

In accordance with some embodiments, computing device 200 may include or otherwise be communicatively coupled with one or more controllers 250. A given controller 250 may be configured to output one or more control signals to control any one or more of the various components and modules of computing device 200 and may do so, for example, based on input (wired, wireless, or both) received from a given local source such as on-board memory 230, a given remote source such as optional server 300 or a control interface, or both local and remote sources. In accordance with some embodiments, a given controller 250 may host one or more control modules and can be programmed or otherwise configured to output one or more control signals to adjust the operation of computing device 200, in part or in whole. In some cases, a given controller 250 may be configured to output a control signal to control operation of a given light-sensing device 260 (discussed below). Other suitable configurations and output for a given controller 250 will depend on a given application and will be apparent in light of this disclosure.

In accordance with some embodiments, computing device 200 may include or otherwise have access to one or more light-sensing devices 260, such as, for example, an ambient light sensor 262, an image capture device 264, or both. Ambient light sensor 262 may be configured to detect ambient light levels (e.g., of the surrounding environment of computing device 200) and output a signal including data pertaining to that stimulus. Image capture device 264 may be configured to capture digital images. To that end, image capture device 264 may be a still camera (e.g., a camera configured to capture still photographs) or a video camera (e.g., a camera configured to capture moving images comprising a plurality of frames). Image capture device 264 may include components such as, for instance, an optics assembly, an image sensor, an image encoder, a video encoder, or a combination thereof. In some cases, image capture device 264 may be, for example, a pinhole camera or other camera like one typically found in smartphones or other mobile computing devices. Image capture device 264 may be configured to detect electromagnetic radiation (e.g., light), for example, from the visible spectral band, the infrared (IR) spectral band, the ultraviolet (UV) spectral band, or any other portion of the electromagnetic spectrum, as desired for a given target application or end-use. In some instances, image capture device 264 may be configured to continuously acquire imaging data. In some other instances, image capture device 264 may be configured to acquire imaging data upon detection of light that exceeds a luminous intensity level threshold or duration threshold (or both), which can be set at any standard or custom value, and in some cases may be user-configurable. In some other instances, image capture device 264 may be configured to acquire imaging data at periodic intervals, user-configurable intervals, or otherwise as frequently as desired for a given target application or end-use. Additional and different types of light-sensing devices 260 may be provided, as desired for a given target application or end-use.

A given light-sensing device 260 may be on-board, built-in, or otherwise integrated with computing device 200 or separate from but communicatively coupled with computing device 200. Components of a given light-sensing device 260 may be implemented in hardware, software, firmware, or a combination of any one or more thereof. In accordance with some embodiments, a given light-sensing device 260 (e.g., ambient light sensor 262; image capture device 264) may be configured to detect LCom signal output of a local transmitting LCom-enabled luminaire 100. Also, in accordance with some embodiments, a given light-sensing device 260 may be configured to provide its output signal to an associated computing device 200. To such ends, a given light-sensing device 260 may include mechanical or solid-state componentry (or both). A given light-sensing device 260 may be configured to perform detection sampling as frequently as desired, and in some cases may do so in real time. In some embodiments, image capture device 264 may be configured to capture image data at a frame rate, for example, in the range of about 24-60 FPS (e.g., about 30 FPS±6 FPS). In some other embodiments, image capture device 264 may be configured to capture image data at a frame rate, for example, in the range of about 120-360 FPS (e.g., about 240 FPS±24 FPS). In some embodiments, ambient light sensor 262 may be configured to detect light at a sampling rate, for example, in the range of about 120-360 Hz (e.g., about 256 Hz±64 Hz). Other suitable configurations for a given light-sensing device 260 will depend on a given application and will be apparent in light of this disclosure.

In accordance with some embodiments, computing device 200 may include a communication module 270 configured to facilitate communication with a given LCom-enabled luminaire 100, another computing device 200, an optional server 300, or a combination thereof. To such ends, communication module 270 may be configured to utilize any of the example communications means and transmission technologies and protocols discussed above, for instance, with respect to communication module 170. In some cases, communication module 270 may be configured to utilize a near field communication (NFC) protocol, a local area network (LAN)-based communication protocol, a cellular-based communication protocol, an Internet-based communication protocol, a satellite-based communication protocol, or a combination thereof. In some cases, communication module 270 of computing device 200 and communication module 170 of a given LCom-enabled luminaire 100 may be configured to utilize the same communications means. Other suitable configurations and wired and wireless communication means for communication module 270 will depend on a given application and will be apparent in light of this disclosure.

In accordance with some embodiments, a given LCom-enabled luminaire 100, computing device 200, or both, optionally may be configured for communicative coupling with a server 300. Server 300 can be any suitable communication network, public or private. In some instances, server 300 may include a second-generation (2G), a third-generation (3G), or a fourth-generation (4G) mobile communication technology, or a combination of any one or more thereof. In some cases, server 300 may be a private local area network (LAN) operatively coupled to a wide area network (WAN), such as the internet. In some instances, server 300 may include a wireless local area network (WLAN) that utilizes wireless a data communication technology, such as Wi-Fi or Bluetooth, among others. In some cases, server 300 may include supporting infrastructure and functionalities, such as a server and a service provider, but such features are not necessary to carry out communication via server 300. In accordance with some embodiments, server 300 may be configured to provide data to a given LCom-enabled luminaire 100, computing device 200, or both, that can be utilized to supplement data by one or more of those elements. In some embodiments, server 300 may be configured to provide data to a given LCom-enabled luminaire 100, computing device 200, or both, that can be used in indoor navigation and trip time estimation. For example, server 300 may provide positioning data, identification (ID) data, building layout data, or any other data of interest. Numerous suitable configurations for server 300 will be apparent in light of this disclosure.

In accordance with some embodiments, a given LCom-enabled luminaire 100, computing device 200, or both, optionally may be configured for communicative coupling with a global positioning system (GPS) 400. GPS 400 may be configured to acquire and communicate location data as typically done. In some cases, GPS 400 may be integral to computing device 200, whereas in some other cases, it may be separate from but communicatively coupled with computing device 200. In some instances, GPS 400 may be hosted by a host vehicle. Other suitable configurations for GPS 400 will depend on a given application and will be apparent in light of this disclosure.

Trip Time Estimation with Light-Based Communication (LCom)

Existing GPS technologies only provide for outdoor trip time calculations. The LCom techniques disclosed herein, however, can be coupled with GPS-based navigation, for example, to enhance total trip time calculation by estimating the total trip time including time associated with indoor tasks. While traveling outdoors, a GPS may be used to estimate the total trip time by providing a user with an estimated time of arrival (ETA). Typically, the ETA is calculated by the GPS based on the total distance and an average speed. The ETA may be updated by the GPS dynamically during the trip. However, as soon as the user reaches the destination and moves indoors, location tracking and trip time calculation by the GPS stop. The LCom techniques disclosed herein, however, can be utilized to enable trip duration and ETA calculation for an entire trip, including the time spent indoors as well as outdoors.

As will be appreciated in light of this disclosure, trip time estimation utilizing the disclosed techniques may provide a user with the capability to make deterministic plans. With GPS alone, the user is only able to determine how long it takes to reach and return from a destination without including time spent indoors at that location. Utilizing the disclosed techniques, however, a user can input (e.g., into a computing device 200) a list of tasks or items of interest and determine the amount of time needed to performs those tasks or acquire those items. In some cases, a user may keep track of the estimated trip time based on a list of tasks to be performed indoors at a given destination. In this manner, a user may optimize or otherwise improve travel plans and timing within a closed environment. This may be done for simple and complex indoor navigation routes alike.

Figure 4:
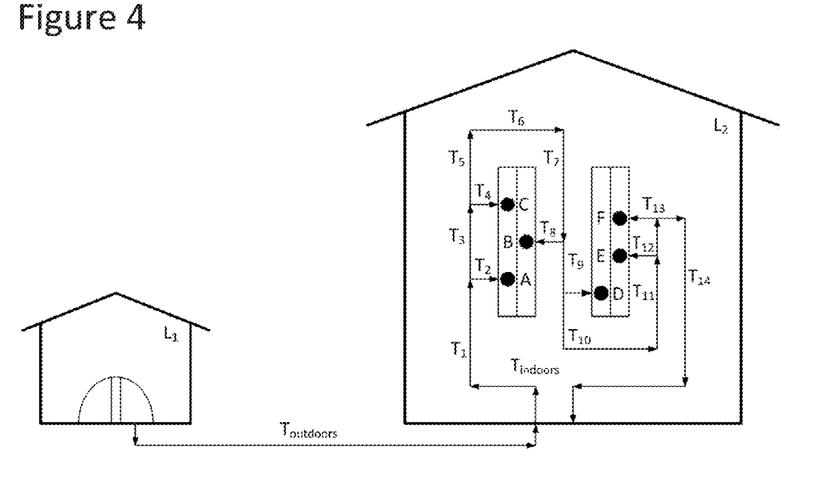
FIG. 4 is a conceptual diagram illustrating an example of outdoor and indoor navigation trip time estimation, in accordance with an embodiment of the present disclosure.

FIG. 4 is a conceptual diagram illustrating an example of outdoor and indoor navigation trip time estimation, in accordance with an embodiment of the present disclosure. The total estimated trip time for navigating along an outdoor route and an indoor route may be determined via computing device 200 according to the relationship: Total Trip Time=$T_{outdoors}+T_{indoors}=T_{GPS}+\Sigma_{I=1}^{I=n}T_1$. The total trip time estimation may account for time spent outdoors (e.g., as determined by GPS) and time spent indoors (e.g., as determined by LCom). In some cases, data pertaining to the amount of time spent indoors may be supplemented, for example, using Wi-Fi triangulation via a Wi-Fi positioning system (WPS) or an accelerometer, among others.

Computing device 200 may receive from a user (or other source) an itinerary of places to visit, items to acquire, tasks to accomplish, or other targets or goals of interest. Computing device 200 may estimate the amount of time required to travel along an outdoor route from an initial location $L_1$ to a destination location $L_2$ where the targeted places, items, etc., are located. This ETA can be estimated via GPS as typically done. To that end, the total outdoor travel time ($T_{outdoors}$) may be estimated based on the total distance between $L_1$ and $L_2$ and the average speed in traveling there between. In some cases, the ETA may be updated dynamically by the GPS during the outdoor leg of the trip.

In accordance with some embodiments, a given LCom-enabled luminaire 100 at destination location $L_2$ may be tagged with its location information, and the area covered by the output of each such LCom-enabled luminaire 100 may be marked geospatially. As will be appreciated in light of this disclosure, geospatially resolved LCom-enabled luminaires 100 may permit fine resolution of LCom signals. Using LCom data output by a transmitting LCom-enabled luminaire 100, computing device 200 may calculate the ETA for each target A, B, C, etc., based on its approximate location relative to each transmitting local LCom-enabled luminaire 100. The time required to travel indoors from targets A to B to C, etc., may be computed, for example, using position data pertaining to LCom-enabled luminaires 100 located along the route for those targets of interest. The total indoor travel time ($T_{indoors}$) may be estimated based on the distance between LCom-enabled luminaires 100 along the route and an assumed average speed of the user, which can be updated dynamically during the indoor trip. Furthermore, computing device 200 may utilize this data to estimate the total amount of time required to navigate along an indoor route that includes those targeted locations. In accordance with some other embodiments, the specific area locations of the target areas or items of interest may be tagged. Thus, when the itinerary is entered (e.g., into computing device 200), the ETA may be calculated based on these nearby approximate locations.

As will be appreciated in light of this disclosure, the disclosed techniques for estimating total trip time utilizing LCom can be used in any of a wide range of indoor navigation contexts. For instance, a hospital staff member may wish to make deterministic plans regarding the amount of time it will take to reach the hospital campus and go from site to site. In another instance, a traveler visiting an office building may intend to visit several offices, and thus may calculate the time needed to reach the office building and then to go from one office to the next in between appointments. In another example case, in a store with location-tagged merchandise, based on a user's shopping list, the user may determine the total amount of time that the shopping trip will take. In another instance, a user may estimate the amount of time required for a car ride into town, finding a parking space, and walking to a given destination. In another example case, a user may estimate the amount of time required for a trip by automobile to a railway or subway station and for walking to the appropriate platform for departure. Numerous suitable applications will be apparent in light of this disclosure.

Enhancing Automotive Navigation with Light-Based Communication (LCom)

Figure 5:
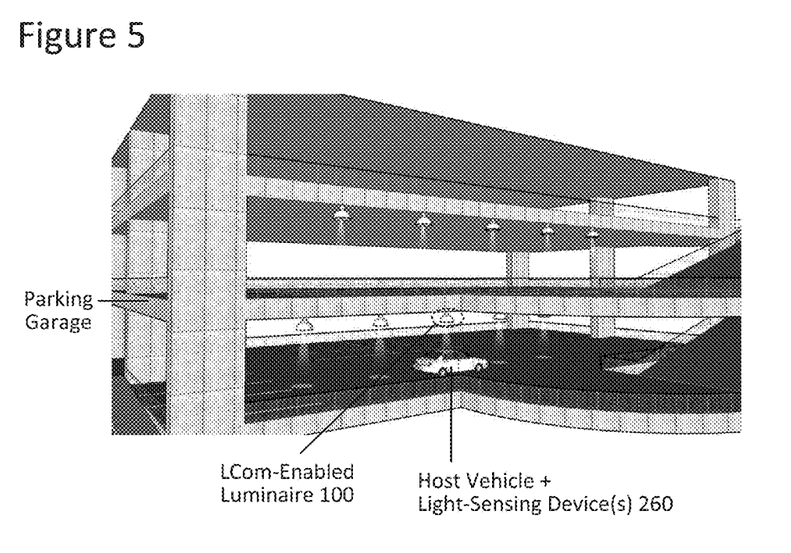
FIG. 5 illustrates an example parking structure including an LCom-enabled luminaire by which a vehicle is navigating, in accordance with an embodiment of the present disclosure.

In areas where GPS signals normally are not available or are otherwise of poor quality, such as in parking structures and tunnels, for example, LCom-enabled luminaires 100 can be utilized to enhance automotive navigation, in accordance with some embodiments. Using one or more on-board light-sensing devices 260, a host vehicle can detect and decode LCom signals including location information as transmitted by a given local LCom-enabled luminaire 100. In turn, that information may be utilized to calculate the position of the host vehicle. As will be appreciated in light of this disclosure, in a number of contexts, LCom may be better suited at providing automobile navigation than traditional approaches that utilize GPS alone. For example, LCom may be able to distinguish features that GPS-based navigation normally cannot, such as overpasses where roads split vertically. Also, LCom may be able to determine where a road splits but GPS is not sufficiently accurate to determine in which lane the driver resides, facilitating lane assistance. Also, LCom may allow for the navigation system of the host vehicle to determine, for example, on which parking level it is located or how to take exits in tunnels, among other uses. FIG. 5 illustrates an example parking structure including an LCom-enabled luminaire 100 by which a vehicle is navigating, in accordance with an embodiment of the present disclosure. Furthermore, LCom may be faster than GPS at calculating position, and thus LCom can be used right away for navigation if LCom-enabled luminaires 100 are available.

Utilizing the disclosed techniques, automotive navigation may be provided via a given light-sensing device 260 either alone or in combination with a GPS 400. When included, GPS 400, which may be configured as a typical GPS unit, may be communicatively coupled with the navigation system 500 of the host vehicle. In some cases, location data acquired and communicated by GPS 400 may be supplemented with location data acquired via an LCom signal received from an LCom-enabled luminaire 100 by a given light-sensing device 260 of computing device 200.

Figure 6A:
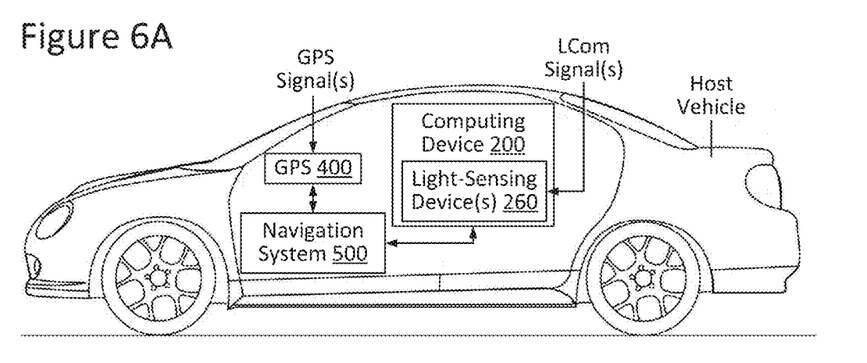
FIG. 6A illustrates a host vehicle including a GPS and one or more light-sensing devices, in accordance with an embodiment of the present disclosure.

In accordance with some embodiments, GPS 400 and light-sensing device(s) 260 may be separate from one another, but both may be communicatively coupled with navigation system 500 of a host vehicle. For example, consider FIG. 6A, which illustrates a host vehicle including a GPS 400 and one or more light-sensing devices 260, in accordance with an embodiment of the present disclosure. In some such instances, light-sensing device(s) 260 may be integral to a computing device 200, whereas in some other such instances, light-sensing device(s) 260 may be stand-alone components. In some instances in which GPS 400 is external to a given light-sensing device 260 (or more generally, computing device 200), it may be desirable to mount it in proximity to GPS 400, as this may facilitate leveraging of the hardware typically used in processing GPS signals and relaying data through the same communication channel as GPS 400.

Figure 6B:
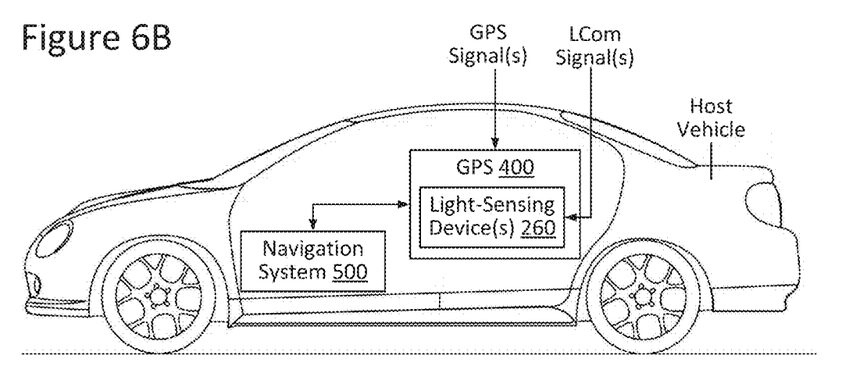
FIG. 6B illustrates a host vehicle including a GPS including one or more light-sensing devices, in accordance with another embodiment of the present disclosure.

In accordance with some other embodiments, light-sensing device(s) 260 may be integrated with GPS 400, which may be communicatively coupled with navigation system 500 of a host vehicle. For example, consider FIG. 6B, which illustrates a host vehicle including a GPS 400 including one or more light-sensing devices 260, in accordance with another embodiment of the present disclosure. In some such instances, having light-sensing device(s) 260 built into GPS 400 may facilitate proper orientation of light-sensing device(s) 260, provide for higher-speed operation of light-sensing device(s) 260, provide for leveraging of hardware already present with GPS 400, or a combination thereof.

Figure 6C:
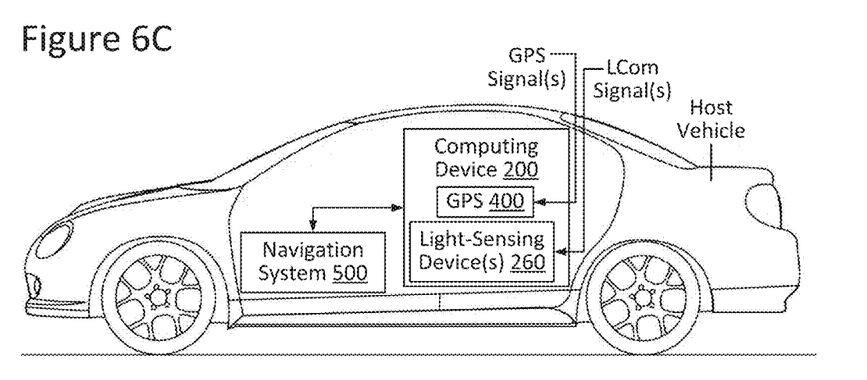
FIG. 6C illustrates a host vehicle including a GPS and one or more light-sensing devices, in accordance with another embodiment of the present disclosure.

In accordance with some still other embodiments, light-sensing device(s) 260 and GPS 400 may be integrated with a computing device 200, which may be communicatively coupled with navigation system 500 of a host vehicle. For example, consider FIG. 6C, which illustrates a host vehicle including a GPS 400 and one or more light-sensing devices 260, in accordance with another embodiment of the present disclosure.

Polling of the environment in effort to detect an LCom signal may be performed by a given light-sensing device 260 in a continuous, periodic, intermittent, or custom basis, which may be user-configurable in some instances. In some cases, polling may begin after a particular condition is met, such as, for example, loss of a GPS signal for GPS 400. A given light-sensing device 260 (e.g., ambient light sensor 262; image capture device 264) of a host vehicle may detect an LCom signal transmitted by a local LCom-enabled luminaire 100. In turn, the received LCom signal may be decoded and processed by a given processor 240, an application 232, a portion of a GPS 400, or a combination thereof. Location data extracted from the LCom signal may be utilized by navigation system 500 for calculating its position. In some instances, location data collected by a given light-sensing device 260 configured in this manner may complement location data collected GPS 400 and, in some cases, be processed by the same hardware as that of GPS 400. In this manner, navigation for automobiles can be expanded or otherwise augmented in areas where a GPS signal is unavailable, significantly degraded in quality, or not adequately precise on its own, such as may be experienced in areas like parking garages, tunnels, ramps, and areas of high congestion, among others. In addition, even with a valid GPS signal, the LCom signals may be used to relay information about traffic conditions and road features, as well as provide accurate lane assistance, in some instances.

As will be appreciated in light of this disclosure, there are a number of factors to consider with respect to the configuration and operation of a given light-sensing device 260 in providing LCom-based navigation as described herein. For instance, a first consideration relates to the positioning of a given light-sensing device 260. A given light-sensing device 260 may be positioned on the exterior or interior of the host vehicle, as desired. Positioning of a given light-sensing device 260 within the host vehicle may help to protect it from environmental hazards and theft, among other issues. When positioned within the host vehicle, a given light-sensing device 260 may be aimed, for example, out of the front windshield, the rear windshield, or the sunroof (if present), as desired. When positioned on the exterior of the host vehicle, a given light-sensing device 260 may be mounted on the hood, roof, trunk, or any other desired portion of the host vehicle, and may be aimed as desired. In an example case, a given light-sensing device 260 may be mounted on a host vehicle proximate an antenna for GPS 400, if included.

A second consideration relates to the orientation of a given light-sensing device 260. In accordance with some embodiments, a given light-sensing device 260 may be oriented such that its FOV is aimed upwards. In some cases, an upward-facing orientation may facilitate accurately determining when a host vehicle is underneath a transmitting LCom-enabled luminaire 100 for purposes of optimizing or otherwise enhancing the accuracy of determining the position of the host vehicle. As will be appreciated in light of this disclosure, an upward-facing light-sensing device 260 may be particularly well-suited at collecting LCom data for a rapidly moving host vehicle. In accordance with some other embodiments, a given light-sensing device 260 may be oriented such that its FOV is aimed forward (e.g., beyond the front or rear end of the host vehicle). In some cases, a forward-facing orientation may allow for reading of a transmitting LCom-enabled luminaire 100 from a greater distance away. As will be appreciated in light of this disclosure, a forward-facing orientation may allow for successful LCom sampling via a light-sensing device 260 such as a typical smartphone camera, because the transmitting LCom-enabled luminaire 100 typically would be in the FOV for a longer period of time. In some cases in which a given light-sensing device 260 is provided with a forward-facing orientation, it may be desirable to estimate the distance from the host vehicle to the transmitting LCom-enabled luminaire 100. Given that the vehicle may be traveling in one direction at high speed, estimating the distance may involve determining the height of the transmitting LCom-enabled luminaire 100. That data may be transmitted in an LCom signal, for example, and may be used in performing geometry calculations on the tracking pixels, which may be performed as typically done.

A third consideration relates to the focal length and field of view (FOV) of a given light-sensing device 260. In accordance with some embodiments, a given light-sensing device 260 may be configured with a focus length that permits it to detect an LCom signal transmitted by an overhead LCom-enabled luminaire 100 yet disregard (e.g., filter out) other light sources, such as the sun. In accordance with some embodiments, a given light-sensing device 260 may be configured with a FOV that is sufficiently narrow to prevent or otherwise reduce the effects of crosstalk between neighboring LCom-enabled luminaires 100 yet sufficiently wide to ensure collection of sufficient pixel data. In some embodiments, a given light-sensing device 260 may be configured to prevent or otherwise reduce effects of environmental factors, such as smoke and reflections from shiny surfaces, among others, that otherwise might negatively impact LCom and thus hinder automotive navigation using LCom.

A fourth consideration relates to the sampling rate of a given light-sensing device 260. In accordance with some embodiments, a given light-sensing device 260 may be configured with a shutter speed that is sufficiently high to detect LCom signals in order to collect LCom data while the host vehicle is traveling past a transmitting LCom-enabled luminaire 100 at high speed. Consider the example case where a host vehicle traveling at about 70 mph passes an LCom-enabled luminaire 100 that is about 2 ft. in diameter. For data integrity, a given light-sensing device 260 may sample two data points per light transition. If the light-sensing device 260 is an image capture device 264, for example, this might relate to five pixels in a rolling shutter image capture mode. In terms of LCom data, the LCom-enabled luminaire 100 might transmit an LCom signal including data pertaining to, for instance, longitude, latitude, altitude, and perhaps another piece of information. If each such data element is 2 bytes (16 bits) in length, then the total data package is 8 bytes (64 bits). For street lamps mounted at a height of about 15 ft., the typical spacing for such lamps might be about 100 ft. apart. For street lamps mounted at a height of about 25 ft., the typical spacing for such lamps might be about 120-150 ft. apart. For overhead parking garage lighting mounted at about 8 ft., the typical spacing for such fixtures might be about 20 ft. apart. Given the above considerations, it may be desirable to ensure that the light-sensing device 260 (e.g., ambient light sensor 262; image capture device 264) samples incoming light at a sufficiently high rate to successfully engage in LCom with the transmitting LCom-enabled luminaire 100. To determine such rate, the visual field for the light-sensing device 260 may be assumed to be one that reduces crosstalk between neighboring LCom-enabled luminaires 100 and maximizes time to collect the incoming LCom signal pulses. Therefore, the FOV for light-sensing device 260 might be half the spacing of neighboring LCom-enabled luminaires 100. Thus, for street lamps mounted at a height of about 15 ft., the FOV would be about 50 ft. For overhead parking garage lighting mounted at about 8 ft., the FOV would be about 10 ft. In accordance with some embodiments, a given light-sensing device 260 may have a FOV having a width/diameter in the range of about 10-100 ft. or greater (e.g., about 10-50 ft., about 50-75 ft., about 75-100 ft., or any other sub-range in the range of about 10-100 ft).

Figure 7A:
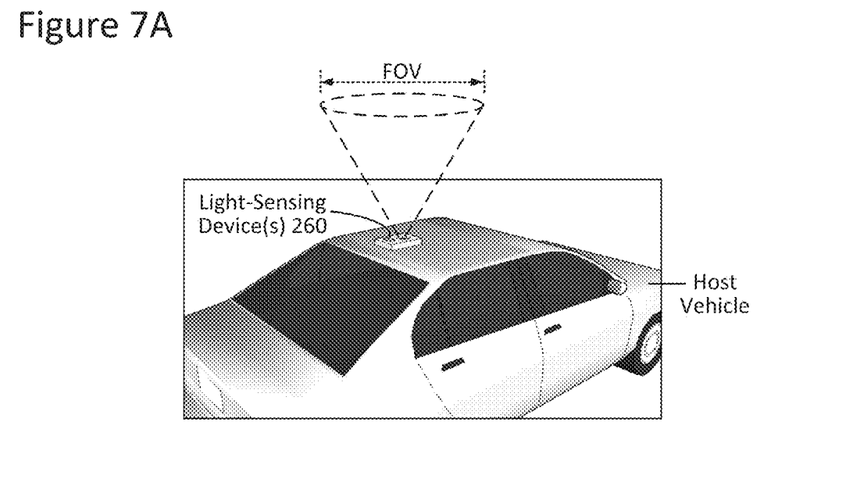
FIG. 7A illustrates a host vehicle including one or more light-sensing devices on its exterior, in accordance with an embodiment of the present disclosure.
Figure 7B:
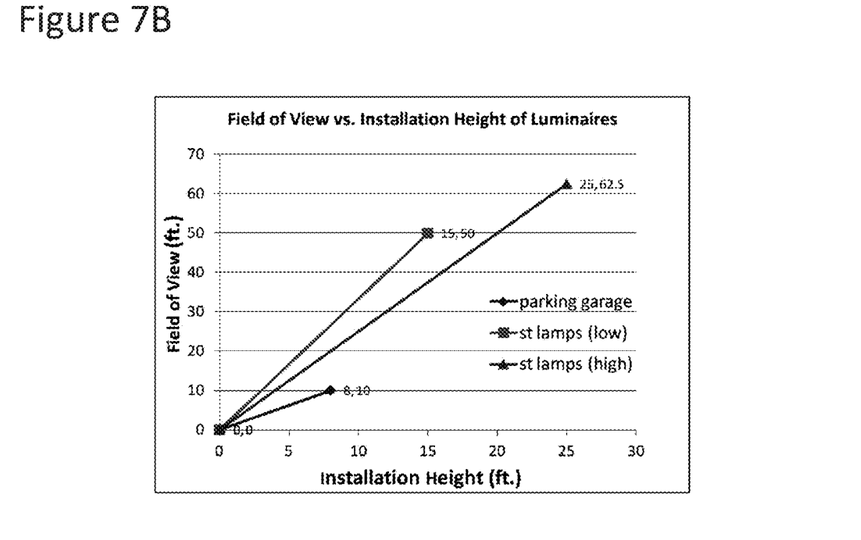
FIG. 7B is a graph of data showing the field of view (FOV) of a light-sensing device as a function of installation height of several example LCom-enabled luminaires configured in accordance with some embodiments of the present disclosure.

FIG. 7A illustrates a host vehicle including one or more light-sensing devices 260 on its exterior, in accordance with an embodiment of the present disclosure. FIG. 7B is a graph of data showing the field of view (FOV) of a light-sensing device 260 as a function of installation height of several example LCom-enabled luminaires 100 configured in accordance with some embodiments of the present disclosure. As can be seen from these example plots, the optimal FOV for a given light-sensing device 260 may be, in some cases, about equal to the half-spacing of the LCom-enabled luminaires 100 from which it will receive LCom signals. To demonstrate, the FOV is about 50 ft. wide for street lamps at a height of about 15 ft. As will be appreciated in light of this disclosure, for successful LCom, the LCom data transmitted by a given LCom-enabled luminaire 100 must be received by the light-sensing device 260 while it has visibility of that transmitting luminaire 100. Thus, a host vehicle traveling at 70 mph (102.6 ft./s) would have about 0.5 s (i.e., $$\left(i.e., \frac{50 \text{ ft.}}{102.6 \text{ ft./s}} = 0.487 \text{ s}\right)$$

to receive 64 bits of data within the 50 ft. FOV. Given this example constraint, if the light-sensing device 260 is an image capture device 264, that may require a frame rate of about 240 FPS (i.e., $$\frac{2 \times 64 \text{ frames}}{0.5 \text{ s}},$$

with the factor of two for satisfying the Nyquist sampling criterion), which is a frame rate associated with typical high-speed cameras. However, if that image capture device 264 has a rolling shutter image capture mode, then even a typical frame rate of 30 FPS may capture the light pulse transitions for successful LCom, as there are at least 1,000 pixels/frame meaning and thus about 100 pixels/transition (i.e., $$\frac{1,000 \text{ pixels} \times 80 \text{ } PPS \times 0.5 \text{ s}}{64 \text{ bits}} \bigg/ 2 \cong 117 \text{ pixels/bit,}$$

with the factor of two for satisfying the Nyquist sampling criterion). If instead the light-sensing device 260 is an ambient light sensor 262, that may require a sampling rate of about 256 Hz (i.e., $$\frac{2 \times 64 \text{ bits}}{0.5 \text{ s}},$$

with the factor of two for satisfying the Nyquist sampling criterion). As will be appreciated in light of this disclosure, this is a reasonable speed at which to sample an ambient light sensor 262 configured as typically done.

Thus, given the above considerations, for a host vehicle to detect an LCom signal and successfully engage in LCom while traveling at about 70 mph, it may be desirable to have a given light-sensing device 260 sample at 240 FPS (e.g., for an image capture device 264 in normal shutter image capture mode), at 30 FPS (e.g., for an image capture device 264 with a rolling shutter image capture mode), or at 256 Hz (e.g., for an ambient light sensor 262 with a somewhat limited FOV). It should be noted that, although the example data plotted in FIG. 7B are representative of example street lamps and overhead parking garage lighting, and the example sampling rate calculations are based thereon, the present disclosure is not intended to be limited only to these illustrative examples. Principles demonstrated by the example plots of FIG. 7B and discussed based on the various sampling rate calculations may extend to any context and site in which LCom-enabled luminaires 100 may be installed and used to transmit LCom data to a local light-sensing device 260, in accordance with other embodiments.

A fifth consideration relates to processing LCom data acquired from LCom signals detected by a given light-sensing device 260. In accordance with some embodiments, LCom signals detected by a given light-sensing device 260 may be processed by a processor 240 of a local computing device 200, in some cases with the aid of one or more applications 232. In accordance with some embodiments, LCom signals detected by a given light-sensing device 260 may be processed by componentry associated with a GPS 400 communicatively coupled therewith.

As will be appreciated in light of this disclosure, a given light-sensing device 260 may be configured to detect additional stimuli beyond just LCom signals. For instance, if a series of street lamps is evenly spaced with a known distance there between, then the passing lights could be counted as they are detected by a given light-sensing device 260 and used for automobile navigation, in accordance with an embodiment. In a specific example case, every fifth street lamp could be an LCom-enabled luminaire 100 transmitting an LCom signal including data indicating that the next four street lamps are spaced approximately 200 ft. apart. As desired, any of those next four street lamps may or may not be configured as LCom-enabled luminaires 100. Therefore, retrofitting a roadway to provide for LCom every few street lamps could be less expensive and complicated than changing over to all LCom-enabled luminaires 100 as street lamps along that road. As another example, a given light-sensing device 260 may be configured to also serve as a camera for use in turning on the headlights, rotating the rear-view mirror, self-parking, back-up viewing, accident monitoring, and self-driving, among others, in accordance with some embodiments.

As described herein, LCom may be utilized in providing automotive navigation in any of a wide range of contexts, and may be particularly useful in areas susceptible to poor reception of GPS signals, such as, for example, a parking garage, tunnel, high-density area, or valley, among others. For instance, consider the example case where the navigation system 500 of a host vehicle is initially navigating via GPS 400, but the GPS signal is lost completely. If the local area has an LCom-enabled luminaire 100 installed thereat, navigation system 500 may switch to navigating using LCom data received via one or more light-sensing device 260. Upon detecting a GPS signal again, the navigation system 500 may switch back to GPS-based navigation.

In another example case, the navigation system 500 of a host vehicle is navigating via GPS 400, but the GPS signal is received only intermittently or is of poor quality. Navigation system 500 may continuously switch back and forth between GPS-based and LCom-based navigation for uninterrupted navigation. To that end, a given light-sensing device 260 may poll the environment for LCom signals constantly or otherwise as desired and, if GPS-based navigation is interrupted, supply LCom-based navigation information.

In yet another example case, the navigation system 500 of a host vehicle is not able to detect a GPS signal to initiate navigation. This may occur when a host vehicle starts up in a parking garage or other area where GPS signals are not normally available. Immediately, the navigation system 500 of the host vehicle may attempt to determine its location, but GPS 400 may not detect any GPS signal. Instead, navigation system 500 may utilize a given light-sensing device 260 to search for a local LCom signal. Once an LCom signal is detected, the navigation system 500 may use LCom data acquired therefrom to calculate the position of the host vehicle and initiate navigation. In some instances, position calculation may occur automatically. Once the host vehicle leaves the area and GPS 400 detects a GPS signal, navigation system 500 may switch to GPS-based navigation.

In still another example case, a host vehicle using GPS-based navigation approaches a section of the road where the left lane becomes an overpass to the right lane. To a typical GPS 400, two overlapping ramps would not be distinguishable and therefore would appear to be the same location. However, navigation system 500 can utilize LCom data acquired by a given light-sensing device 260 from a transmitting LCom-enabled luminaire 100 local to this area to determine which lane is proper. As a result, navigation system 500 may track itself knowing its exact location with respect to each ramp.

Numerous embodiments will be apparent in light of this disclosure. One example embodiment provides a computing device including: a light-sensing device configured to detect a pulsing light signal encoded with data about a location of a solid-state luminaire transmitting that signal; and a processor configured to analyze the location data and compute therefrom at least one of: an indoor navigation time to the location of the solid-state luminaire; and an automotive navigation route. In some cases, the processor is further configured to: analyze data received from a global positioning system (GPS); and compute a total time for outdoor and indoor navigation to the location of the solid-state luminaire using the location data and the GPS data. In some such cases, indoor navigation time is computed based on: a distance between the solid-state luminaire transmitting the pulsing light signal and a second solid-state luminaire transmitting a second pulsing light signal encoded with data about a location of that second solid-state luminaire; and an average speed of the computing device at the location of at least one of those solid-state luminaires. In some instances, the processor is further configured to: analyze input about at least one of a place to visit, an item to acquire, and a task to accomplish at the location of the solid-state luminaire; and compute the indoor navigation time to the location of the solid-state luminaire using the location data and that input. In some cases, the processor is further configured to: analyze data received from at least one of a Wi-Fi positioning system (WPS) and an accelerometer; and compute the indoor navigation time to the location of the solid-state luminaire using the location data and the at least one of WPS data and accelerometer data. In some instances, the processor is further configured to: analyze data received from a global positioning system (GPS); and compute the automotive navigation route using the location data and the GPS data. In some cases, the pulsing light signal is encoded with data about at least one of a traffic condition and a roadway condition; and the processor is further configured to: analyze the at least one of traffic condition data and roadway condition data; and compute the automotive navigation route using the location data and the at least one of traffic condition data and roadway condition data. In some instances, the light-sensing device includes at least one of: an image capture device configured to perform a rolling shutter image capture at a frame rate of about 30 frames per second (FPS)±6 FPS in detecting the pulsing light signal; an image capture device configured to capture image data at a frame rate of about 240 FPS±24 FPS in detecting the pulsing light signal; and an ambient light sensor configured to detect light at a sampling rate of about 256 Hz±64 Hz in detecting the pulsing light signal. In some cases, the light-sensing device has a field of view (FOV) having a width in the range of about 10-100 ft. In some instances, the computing device further includes a global positioning system (GPS) module operatively coupled with the processor.

Another example embodiment provides a method of light-based communication, the method including: receiving, via at least one of a camera and an ambient light sensor, data about a location of a solid-state luminaire transmitting a pulsing light signal encoded with that location data; and computing from the location data at least one of: an indoor navigation time to the location of the solid-state luminaire; and an automotive navigation route. In some cases, the method further includes: receiving data from a global positioning system (GPS); and at least one of: computing a total time for outdoor and indoor navigation to the location of the solid-state luminaire using the location data and the GPS data; and computing the automotive navigation route using the location data and the GPS data. In some instances, the method further includes: receiving input about at least one of a place to visit, an item to acquire, and a task to accomplish at the location of the solid-state luminaire; and computing the indoor navigation time to the location of the solid-state luminaire using the location data and that input. In some cases, the method further includes: receiving data from at least one of a Wi-Fi positioning system (WPS) and an accelerometer; and computing the indoor navigation time to the location of the solid-state luminaire using the location data and the at least one of WPS data and accelerometer data. In some instances, the method further includes: receiving, via the at least one of a camera and an ambient light sensor, data about at least one of a traffic condition and a roadway condition, wherein the pulsing light signal is encoded with that data; and computing the automotive navigation route using the location data and the at least one of traffic condition data and roadway condition data.

Another example embodiment provides a non-transitory computer program product encoded with instructions that, when executed by one or more processors, causes a process to be carried out, the process including: analyzing data about a location of a solid-state luminaire transmitting a pulsing light signal encoded with that location data; and computing from the location data at least one of: an indoor navigation time to the location of the solid-state luminaire; and an automotive navigation route. In some cases, the process further includes: analyzing data from a global positioning system (GPS); and at least one of: computing a total time for outdoor and indoor navigation to the location of the solid-state luminaire using the location data and the GPS data; and computing the automotive navigation route using the location data and the GPS data. In some instances, the process further includes: analyzing input about at least one of a place to visit, an item to acquire, and a task to accomplish at the location of the solid-state luminaire; and computing the indoor navigation time to the location of the solid-state luminaire using the location data and that input. In some cases, the process further includes: analyzing data from at least one of a Wi-Fi positioning system (WPS) and an accelerometer; and computing the indoor navigation time to the location of the solid-state luminaire using the location data and the at least one of WPS data and accelerometer data. In some instances, the process further includes: analyzing data about at least one of a traffic condition and a roadway condition, wherein the pulsing light signal is encoded with that data; and computing the automotive navigation route using the location data and the at least one of traffic condition data and roadway condition data.

Another example embodiment provides a method of light-based communication, the method including: transmitting, via a solid-state luminaire, a pulsing light signal encoded with data about a location of that solid-state luminaire, wherein an area covered by output of the solid-state luminaire is marked geospatially. In some cases, the location of the solid-state luminaire includes at least one of an airport, a train station, a hospital, an office, a store, and a shopping mall. In some instances, the location of the solid-state luminaire includes a covered area where global positioning system (GPS)-based navigation is unavailable. In some cases, the pulsing light signal is also encoded with data about at least one of a traffic condition and a roadway condition.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A computing device comprising:
   a light-sensing device configured to detect pulsing light signals encoded with data about a location of a solid-state luminaire transmitting that signal, wherein the light-sensing device comprises at least one of:
      an image capture device configured to perform a rolling shutter image capture at a frame rate of about 30 frames per second (FPS)±6 FPS in detecting the pulsing light signals;
      an image capture device configured to capture image data at a frame rate of about 240 FPS±24 FPS in detecting the pulsing light signals; and
      an ambient light sensor configured to detect light at a sampling rate of about 256 Hz±64 Hz in detecting the pulsing light signals; and
   a processor configured to:
      receive user input comprising a list of places to visit, items to acquire, or tasks to accomplish, wherein at least one entry in the list is located in an indoor environment;
      determine a navigation route to travel to each entry in the list;
      identify a location of a plurality of solid-state luminaires along the navigation route;
      compute an estimated travel time for the navigation route based on the location of the plurality of solid-state luminaires;
      receive a first pulsing light signal encoding a first location of a first solid-state luminaire in the plurality of luminaires; and
      update the estimated travel time based on the first location.

2. The computing device of claim 1, wherein the processor is further configured to:
   analyze data received from a global positioning system (GPS); and
   update the estimated travel time based on the GPS data.

3. The computing device of claim 1, wherein the processor is further configured to update the estimated travel time based on an average speed of the computing device at the location of the first solid-state luminaire.

4. The computing device of claim 1, wherein the processor is further configured to:
   analyze data received from at least one of a Wi-Fi positioning system (WPS) and an accelerometer; and
   update the estimated travel time based on at least one of WPS data and accelerometer data.

5. The computing device of claim 1, wherein:
   the first pulsing light signal is further encoded with data about at least one of a traffic condition and a roadway condition; and
   the processor is further configured to:
      analyze the at least one of traffic condition data and roadway condition data; and update the estimated travel time based on the at least one of traffic condition data and roadway condition data.

6. The computing device of claim 1, wherein the light-sensing device has a field of view (FOV) having a width in the range of about 10-100 ft.

7. The computing device of claim 1 further comprising a global positioning system (GPS) module operatively coupled with the processor.

8. A method of light-based communication, the method comprising:
- receiving user input comprising a list of places to visit, items to acquire, or tasks to accomplish, wherein at least one entry in the list is located in an indoor environment;
- determining a navigation route to travel to each entry in the list;
- identifying a location of a plurality of solid-state luminaires along the navigation route;
- computing an estimated travel time for the navigation route based on the location of the plurality of solid-state luminaires;
- receiving, via a light-sensing device, a first pulsing light signal encoding a first location of a first solid-state luminaire in the plurality of luminaires, wherein the light-sensing device comprises at least one of:
  - an image capture device configured to perform a rolling shutter image capture at a frame rate of about 30 frames per second (FPS)±6 FPS in detecting the pulsing light signals;
  - an image capture device configured to capture image data at a frame rate of about 240 FPS±24 FPS in detecting the pulsing light signals; and
  - an ambient light sensor configured to detect light at a sampling rate of about 256 Hz±64 Hz in detecting the pulsing light signals; and
- updating the estimated travel time based on the first location.

9. The method of claim 8 further comprising:
- receiving data from a global positioning system (GPS); and
- updating the estimated travel time based on the GPS data.

10. The method of claim 8 further comprising:
- receiving data from at least one of a Wi-Fi positioning system (WPS) and an accelerometer; and
- updating the estimated travel time based on the at least one of WPS data and accelerometer data.

11. The method of claim 8 further comprising:
- receiving data about at least one of a traffic condition and a roadway condition encoded in the first pulsing light signal; and
- updating the estimated travel time based on the at least one of traffic condition data and roadway condition data.

12. A non-transitory computer program product encoded with instructions that, when executed by one or more processors, causes a process to be carried out, the process comprising:
- receiving user input comprising a list of places to visit, items to acquire, or tasks to accomplish, wherein at least one entry in the list is located in an indoor environment;
- determining a navigation route to travel to each entry in the list;
- identifying a location of a plurality of solid-state luminaires along the navigation route;
- computing an estimated travel time for the navigation route based on the location of the plurality of solid-state luminaires;
- receiving, via a light-sensing device, a first pulsing light signal encoding a first location of a first solid-state luminaire in the plurality of luminaires, wherein the light-sensing device comprises at least one of:
  - an image capture device configured to perform a rolling shutter image capture at a frame rate of about 30 frames per second (FPS)±6 FPS in detecting the pulsing light signals;
  - an image capture device configured to capture image data at a frame rate of about 240 FPS±24 FPS in detecting the pulsing light signals; and
  - an ambient light sensor configured to detect light at a sampling rate of about 256 Hz±64 Hz in detecting the pulsing light signals; and
- updating the estimated travel time based on the first location.

13. The non-transitory computer program product of claim 12, wherein the process further comprises:
- analyzing data from a global positioning system (GPS); and
- updating the estimated travel time based on the GPS data.

14. The non-transitory computer program product of claim 12, wherein the process further comprises:
- analyzing data from at least one of a Wi-Fi positioning system (WPS) and an accelerometer; and
- updating the estimated travel time based on the at least one of WPS data and accelerometer data.

15. The non-transitory computer program product of claim 12, wherein the process further comprises:
- analyzing data about at least one of a traffic condition and a roadway condition encoded in the first pulsing light signal; and
- updating the estimated travel time based on the at least one of traffic condition data and roadway condition data.

* * * * *